H. G. PECK.
GAGE.
APPLICATION FILED MAR. 14, 1919.
1,357,588.
Patented Nov. 2, 1920.
2 SHEETS—SHEET 1.
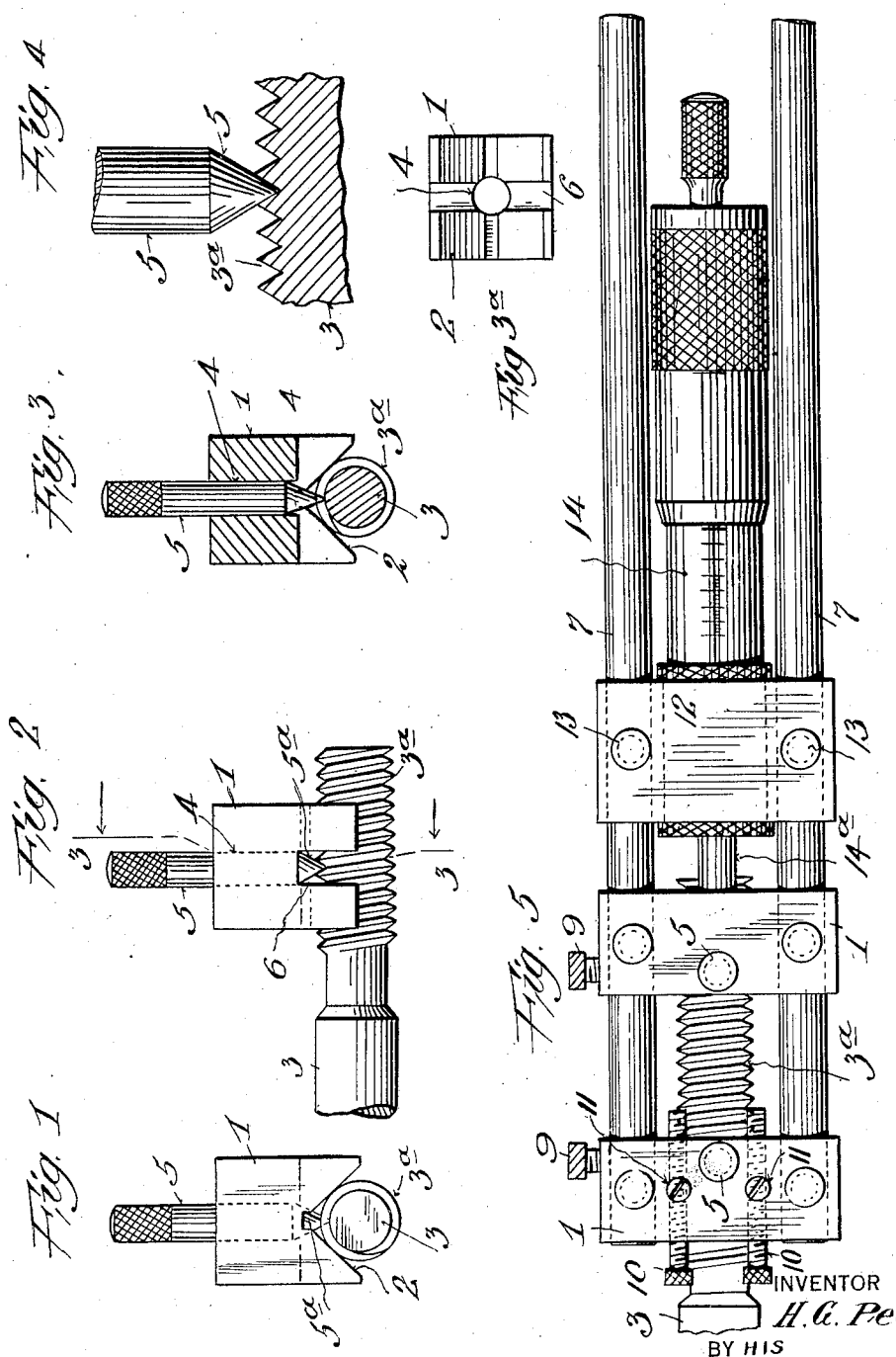
INVENTOR
H. G. Peck
BY HIS
T. F. Bourne
ATTORNEY H. G. PECK.
GAGE.
APPLICATION FILED MAR. 14, 1919.
1,357,588.
Patented Nov. 2, 1920.
2 SHEETS—SHEET 2.
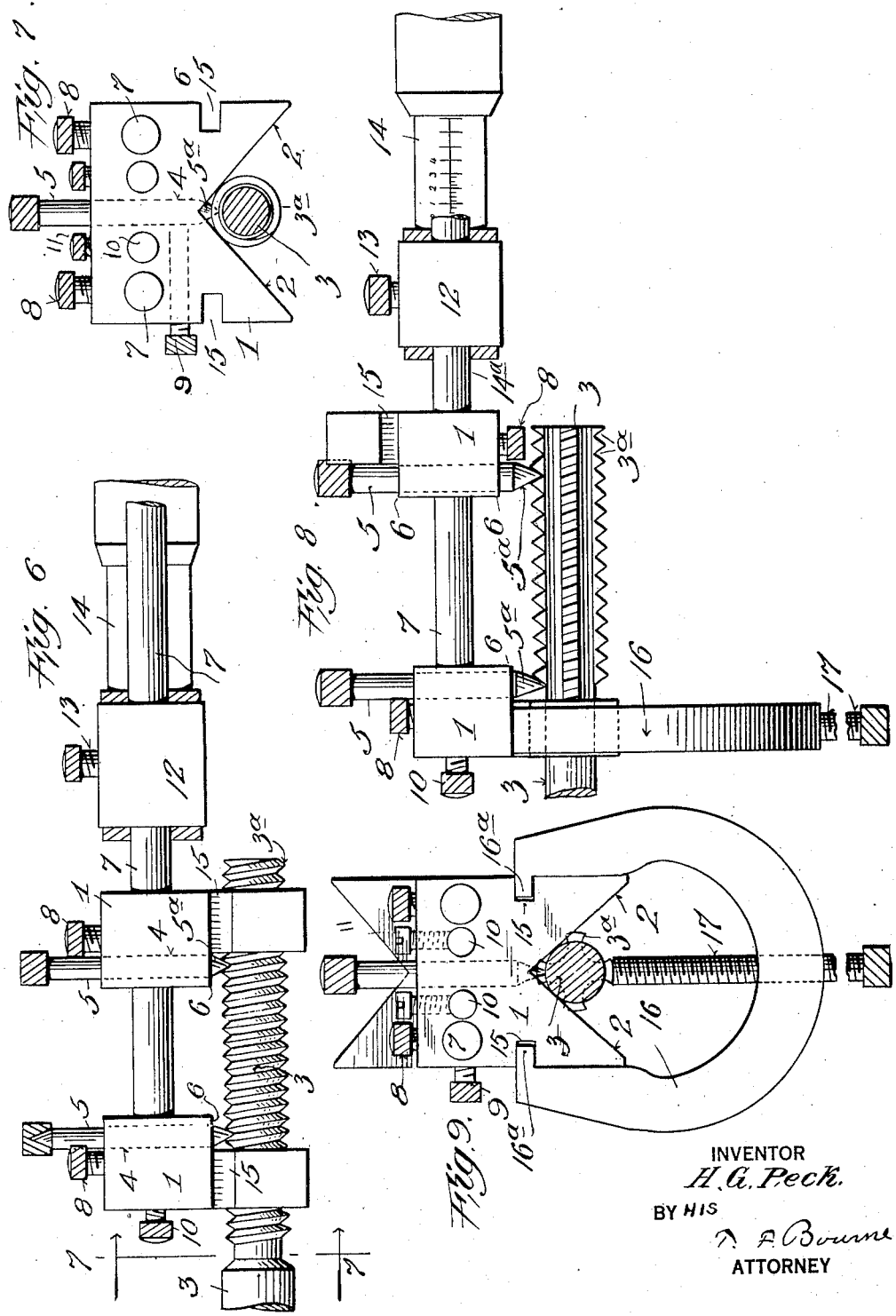
INVENTOR
H. G. Peck.
BY HIS
F. Bourne
ATTORNEY

UNITED STATES PATENT OFFICE.

HERBERT G. PECK, OF BLOOMFIELD, NEW JERSEY.

GAGE.

1,357,588.  Specification of Letters Patent.  Patented Nov. 2, 1920.

Application filed March 14, 1919. Serial No. 282,537.

*To all whom it may concern:*

Be it known that I, HERBERT G. PECK, a citizen of the United States, and resident of Bloomfield, in the county of Essex and State of New Jersey, have invented certain new and useful Improvements in Gages, of which the following is a specification.

The object of my invention is to provide a simple and accurate gage whereby the angle of threads on rods, taps, bolts and other parts may be accurately determined.

My invention also is adapted for use in determining the accuracy of spacing of threads for different distances along such rods, bolts and the like.

My invention comprises novel details of improvement that will be more fully hereinafter set forth and then pointed out in the claims.

Reference is to be had to the accompanying drawings forming part hereof in which—

Figure 1 is a side view of my improved gage;

Fig. 2 is a view at right angles to Fig. 1;

Fig. 3 is a cross section on the line 3—3 in Fig. 2;

Fig. 3ª is a plan view of the lower side thereof;

Fig. 4 is an enlarged detail view;

Fig. 5 is a plan view of my invention adapted for measuring the distance between threads on a rod, bolt or the like;

Fig. 6 is a side view of Fig. 5;

Fig. 7 is a cross section along the line 7—7 in Fig. 6;

Fig. 8 is a side view substantially similar to Fig. 6, illustrating the gage members in position to measure threads upon a rod or the like whose shank is of less diameter than the threaded portion thereof; and Fig. 9 is an end view of Fig. 8.

Similar numerals of reference indicate corresponding parts in the several views.

The numeral 1 indicates a main member shown in the form of a block, having in one side a recess 2 adapted to receive and fit upon the threads 3ª of a rod, bolt, tap or the like 3. The recess 2 is shown in V-shape form, which may be of a suitable angle whereby the faces of the recess of member 1 will rest snugly upon the threads 3ª and be accurately positioned thereon, since said faces will fit on the threads on opposite sides respecting the plane of the axis of the threads. Member 1 is provided with a hole 4 extending through the same from the side opposite recess 2 and opening into said recess to oppose the space between two threads on a rod or the like 3, which hole terminates in the apex of recess 2. At 5 is a pin or adjustable member slidable in hole 4 of member 1 and having its lower end sharpened, as cone-like in form at 5ª, to fit in the space between threads on a rod or the like. The angle of the sharpened end 5ª may be such as to correspond to the angle between given threads on a rod or the like, and pins 5 having different angular tapering or sharpened ends may be provided for different characters of threads to be gaged, all of which pins may be adapted to snugly fit the hole 4 of member 1 to provide for interchangeability of such pins. Member 1 is provided with a transverse opening recess or ledge indicated at 6 which opens through or extends to opposite sides of said member and intersects or merges with the recess 2, or nearly so, whereby the tapering end 5ª of pin 5 may be seen between at least two threads on a rod or the like 3, as illustrated in Figs. 2, 6 and 8. When the angle between two threads on a rod or the like is to be gaged the member 1 is placed upon the threads 3ª which enter the recess 2, and pin 5 is depressed through hole 4 of said member until the tapering end of the pin has properly entered between said threads. The operator then may view through the opening 6 the position of the tapering end of said pin in said threads and thereby may determine by observation how accurately the angle between said threads corresponds to the taper or angle of the end 5ª of pin 5. The member 1 has the advantage of enabling the pin 5 to be accurately retained in position upon the threads 3ª positively at right angles to the axis of said threads, whereby the relation of the angle of the tapering end of the pin to the angle between the threads 3ª may be determined without deviation of the pin in one way or another from its properly set position upon the threads.

In order to be able not only to gage or determine the angle between threads on a rod or the like 3 but also the distance between spaced threads thereon, I provide a plurality of members 1 adjustable with relation to one another. Said members each have a recess 2 adapted to fit upon threads 3ª, which members each have a hole 4 adapted to receive the corresponding pin 5 provided with a tapering cone-like end 5ᵃ which fits between two threads 3ᵃ and with the ledge 6 at right angles to recess 2 as before described, whereby the tapering end 5ᵃ of the corresponding pin 5 may be observed between two such threads, (see Figs. 6 and 8). Said members 1 are shown mounted upon two parallel rods 7 which are received in holes correspondingly located in the members 1, whereby the recesses 2 of said members will be in parallelism to equally rest upon the threads 3ᵃ of a rod, bolt or the like 3. The members 1 are shown provided with screws 8 (Fig. 7) whereby said members may be secured in spaced relation along rods 7 as desired. The members 1 are shown provided with transverse screws 9 adapted to bear against corresponding pin 5 to retain the latter in set position when desired. One of members 1, such as the one adjacent to the ends of rods 7, is shown provided with screws 10 (Fig. 5) of sufficient length to pass through said member into position against the adjacent member for spacing the latter away from the former to space the two corresponding pins 5 along threads 3ᵃ of rod or the like 3. Screws 11 in the member 1 that has screws 10 are adapted to bear against the last named screws to retain the latter in set position. The members 1 are interchangeable upon rods 7 and may be placed in the relative positions shown in Fig. 6, or may be reversed in position back to back, or one member may be set upside down with relation to the other member, as illustrated in Fig. 8. At 12 is a block adjustable on rods 7 and provided with suitable holes to receive said rods, which block is shown provided with screws 13 to bear against the corresponding rod 7 for retaining the block 12 in set position on said rods. The block 12 is adapted to support a measuring instrument or screw member to bear against the adjacent member 1. I have illustrated a micrometer head 14, which may be of any suitable construction, carried by block 12. Said micrometer head is shown located between rods 7 and extending parallel therewith so that the stem or adjustable measuring member 14ᵃ of said head opposes the adjacent block 1 and is adapted to engage the same.

When the distance between threads 3ᵃ on a rod or the like 3 is to be determined or gaged, one of the members 1 may be secured in position upon rods 7, such as member 1 at the left hand side of Fig. 6. The instrument may then be applied upon the threads 3ᵃ with the pin 5 of the left hand member 1 located between two threads 3ᵃ and the pin may then be secured by the screw 9. The other member 1 may be set close against the first named member, and then block 12 may be set in the desired relation to member 1, and the micrometer head may be adjusted so that its stem 14ᵃ will bear against the adjacent member 1, and a reading may be taken on the micrometer head. The stem 14ᵃ may then be moved away from said member 1 and the latter may be adjusted along rods 7 and threads 3ᵃ until the pin 5, of said member has been entered between the desired pair of threads and then said member may be secured by screws 8 to rods 7. The micrometer head may then be operated until its stem 14ᵃ bears against the adjacent member 1 and another reading of the micrometer head may be had, whereby the distance between a given number of threads or their pitch may be accurately determined. Other ways of manipulating the micrometer head in connection with the spacing of two members 1 along threads 3ᵃ of rod or the like may be carried out according to the skill of the user. The angles of the threads engaged by the pins 5 also may be determined.

In some kinds of rods, bolts, taps and the like, where the shank is of less diameter than the threads, and where it is desired to measure from the joint or junction between the stem and the first thread thereon, such as illustrated in Figs. 8 and 9, one of the members 1 may be reversed with relation to the other member 1 upon rods 7, or in other words one of the members would be turned upside down from the position shown in Fig. 6 to the position shown in Figs. 8 and 9, so that the pin 5 of one of the members may bear against the shank of rod or the like 3 while the pin 5 of the other member will enter between threads 3ᵃ of said rod. To hold said shank firmly in recess 2 of such reversed member the sides of either or all of said members are notched at 15 to receive the prongs 16ᵃ of yoke 16. Said yoke is shown provided with screws 17 of suitable length, shown extending from the midportion of the yoke, adapted to bear against the shank of rod or the like 3 to force the same into the recess 2 to hold said rod or the like rigidly to the corresponding member. With the parts in such position the other member may be adjusted along rod 7 to the desired position to locate the tapering end 5ᵃ of its pin 5 between two threads 3ᵃ, and a measurement of the threads may be taken by means of the micrometer head as before described, or in any other desired manner.

The spaced V-like members serve to correlate the parts upon a rod or the like, whereby they will be maintained in parallelism thereon when measuring the same.

While I have disclosed the use of a threaded member, such as a micrometer head, for measuring the distance between spaced members 1, it will be understood that such distance may be measured by any other suitable means, such as by means of size blocks of any ordinary or usual construction interposed between spaced members 1 or by applying the micrometer upon two spaced members 1 in the usual way of using a micrometer.

I have referred to my invention as applicable for gaging or measuring threads upon rods, taps, bolts or the like, but it will be understood that the invention is applicable to gaging or measuring parts having spaced notches or grooves as well as teeth, such as upon racks and rack bars and similar spaced projections or recesses on or in different parts and by the use of the term "threads" herein I intend to include all of the foregoing.

My improvements will be found simple to use and are of great utility in enabling accurate gaging of threads upon rods and other parts, both as to the angle of the threads and their spacing or pitch, since such angle may be readily gaged visually by merely looking along the tapering portion of pin 5 where it is exposed along the opening recess or edge 6. Furthermore, the members 1 when once set upon the rods 7 for a given character of threads 3ª may be retained set for gaging of successive parts carrying similar threads.

My invention is simple and inexpensive to manufacture, is not liable to get out of order, and is readily operable without requiring skilful manipulation of completed parts.

While I have illustrated and described a specific form of my invention, it will be understood that changes may be made in the details of construction set forth, within the scope of the appended claims, without departing from the spirit of my invention.

Having thus described my invention, what I claim and desire to secure by Letters Patent is:—

1. A gage comprising a member provided with a recess having angularly disposed faces to fit upon threads, a pin movable in the member at the angle of said faces and having a portion adapted to coöperate with said threads, said member having an opening disposed transversely with respect to the recess to permit observation of the pin in said threads.

2. A gage comprising a member having a recess provided with angularly disposed faces to fit upon opposite sides of threads and having an opening extending transversely of the recess and merging therewith, said member also having a hole opening into the recess at the apex thereof, and a pin movable in said hole to enter the recess to permit observation of the pin through the opening.

3. A gage comprising a block provided with a V-like recess to fit upon threads and having a hole opening into the recess at the apex thereof, and a pin having a tapering end adapted to pass from said hole into the recess.

4. A gage comprising a plurality of members each having a recess to fit upon threads, means to support said members in spaced relation for movement relatively to one another laterally with respect to such threads, each of said members having a pin movable relatively to said recess and having an opening transverse to the corresponding recess to permit observation of the corresponding pin.

5. A gage comprising a plurality of members each having a recess to fit upon threads, means to support said members in spaced relation for movement relatively to one another laterally with respect to such threads, each of said members having a pin movable relatively to said recess, each of said members having a recess extending transversely with respect to the first named recess to permit observation of the corresponding pin with respect to the last named recess.

6. A gage comprising a plurality of members each having a recess to fit upon threads, means to support said members in spaced relation for movement relatively to one another laterally with respect to such threads, each of said members having a pin movable relatively to said recess and having means transverse to the corresponding recess to permit observation of the corresponding pin, a block carried by said supporting means adapted to be spaced from said members, and measuring means upon the block adjustable with relation thereto for indicating the extent of adjustment of one of said members relatively to the other.

7. A gage comprisng a plurality of members each having a recess to fit upon threads, means to support said members in spaced relation for movement relatively to one another laterally with respect to such threads, each of said members having a pin movable relatively to said recess and having means transverse to the corresponding recess to permit observation of the corresponding pin, a block carried by said supporting means adapted to be spaced from said members, and a micrometer head carried by said block adapted to measure the extent of adjustment of one of said members relatively to the other.

8. A measuring instrument comprising a plurality of members each having a recess adapted to fit upon threads, pins movable in said members to coöperate with said threads, said members having an opening extending transversely to the first named means to permit observation of the corresponding pin in said threads, and rods supporting said members in spaced relation, a block carried by said rods, and measuring means upon said block to coöperate with one of said members for measuring the extent of adjustment thereof relative to another member.

9. A measuring instrument comprising a plurality of members each having a recess adapted to fit upon threads, pins movable in said members to coöperate with said threads, said members having an opening extending transversely to the first named means to permit observation of the corresponding pin in said threads, and rods supporting said members in spaced relation, a block carried by said rods and a micrometer head carried by said block having an adjustable member opposing one of said first named members whereby the extent of adjustment of the latter relative to another member may be determined.

10. A measuring instrument comprising a plurality of members each having a recess adapted to fit upon threads, pins movable in said members to coöperate with said threads, said members having an opening extending transversely to the first named means to permit observation of the corresponding pin in said threads, and rods supporting said members in spaced relation, one of said members having adjustable means adapted to coöperate with the other member to regulate the spaced relation of said members upon said rods.

11. A gage comprising a member provided with a recess to fit upon threads, a pin movable in the member having a portion adapted to coöperate with said threads, said member having a recess disposed transversely with respect to the first named recess to permit observation of the pin in said threads, and a yoke having means to coöperate with said member and having means to coöperate with a part to be gaged located in the first named recess of said member.

12. A gage comprising a member provided with a recess to fit upon threads, a pin movable in the member having a portion adapted to coöperate with said threads, said member having a recess disposed transversely with respect to the first named recess to permit observation of the pin in said threads, said member having notches, and a yoke having prongs to coöperate with said notches, said yoke having a screw operative to secure a part to be gaged in the first named recess of said member.

Signed at New York in the county of New York and State of New York this 26th day of February A. D. 1919.

HERBERT G. PECK.